United States Patent
Jeong et al.

(10) Patent No.: US 8,996,297 B2
(45) Date of Patent: Mar. 31, 2015

(54) SYSTEM AND METHOD FOR OFF-ROUTE DETERMINATION VIA THRESHOLD FOR SAFE TAXI SERVICE

(75) Inventors: Dae-yeon Jeong, Hwaseong-si (KR); Hyun-suk Min, Suwon-si (KR); Young-sik Lee, Suwon-si (KR); Jong-hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 13/216,287

(22) Filed: Aug. 24, 2011

(65) Prior Publication Data

US 2012/0150427 A1 Jun. 14, 2012

(30) Foreign Application Priority Data

Dec. 9, 2010 (KR) .................. 10-2010-0125661

(51) Int. Cl.
| | | |
|---|---|---|
| G01C 9/00 | (2006.01) | |
| G01C 17/00 | (2006.01) | |
| G01C 19/00 | (2013.01) | |
| G01C 21/34 | (2006.01) | |
| G01C 21/36 | (2006.01) | |

(52) U.S. Cl.
CPC ........ *G01C 21/3407* (2013.01); *G01C 21/3697* (2013.01)
USPC ............ 701/409; 701/417; 701/465; 702/150

(58) Field of Classification Search
None
See application file for complete search history.

(56) References Cited

U.S. PATENT DOCUMENTS

| | | | | |
|---|---|---|---|---|
| 6,347,278 | B2* | 2/2002 | Ito .................................. | 701/411 |
| 6,385,539 | B1* | 5/2002 | Wilson et al. ................. | 701/468 |
| 6,411,895 | B1* | 6/2002 | Lau et al. ...................... | 701/425 |
| 6,459,988 | B1* | 10/2002 | Fan et al. ....................... | 701/468 |
| 6,487,496 | B2* | 11/2002 | Katayama et al. ............. | 701/417 |
| 6,823,259 | B2* | 11/2004 | Miyazawa ..................... | 701/431 |
| 7,403,134 | B2* | 7/2008 | Kong ............................. | 340/994 |
| 7,680,594 | B2* | 3/2010 | Cabral et al. .................. | 701/423 |
| 7,817,033 | B2* | 10/2010 | Motoyama ............... | 340/539.32 |
| 7,818,121 | B2* | 10/2010 | Uyeki et al. ................... | 701/413 |
| 8,204,688 | B2* | 6/2012 | Cabral et al. .................. | 701/533 |
| 2002/0007239 | A1* | 1/2002 | Matsumoto et al. ............ | 701/41 |
| 2002/0041229 | A1* | 4/2002 | Satoh et al. .................... | 340/438 |
| 2002/0087255 | A1* | 7/2002 | Jindo et al. ....................... | 701/96 |
| 2002/0169531 | A1* | 11/2002 | Kawazoe et al. ............... | 701/41 |
| 2003/0014162 | A1* | 1/2003 | Sadano ............................. | 701/1 |
| 2003/0065441 | A1* | 4/2003 | Funk ............................. | 701/207 |
| 2003/0097206 | A1* | 5/2003 | Matsumoto et al. .............. | 701/1 |
| 2003/0120414 | A1* | 6/2003 | Matsumoto et al. ............ | 701/96 |
| 2003/0195667 | A1* | 10/2003 | Tange et al. ....................... | 701/1 |
| 2004/0010371 | A1* | 1/2004 | Matsumoto et al. .......... | 701/300 |
| 2004/0024522 | A1* | 2/2004 | Walker et al. ................. | 701/210 |
| 2004/0098197 | A1* | 5/2004 | Matsumoto et al. .......... | 701/301 |
| 2004/0102884 | A1* | 5/2004 | Tange et al. ..................... | 701/48 |

(Continued)

*Primary Examiner* — Calvin Cheung
*Assistant Examiner* — Krishnan Rameshkrishnan Ramesh
(74) *Attorney, Agent, or Firm* — Sughrue Mion, PLLC

(57) ABSTRACT

Provided are a system and method for a safe taxi service. The method for a safe taxi service in a mobile device includes: transmitting input information regarding a destination to a vehicle information system; periodically receiving information regarding a current location of a vehicle from the vehicle information system; comparing the current location with an expected path to the destination; and transmitting state information to an external system when it is determined, according to the comparing, that the current location deviates from the expected path to the destination to an extent equal to or greater than a predetermined limit.

14 Claims, 3 Drawing Sheets

(56) References Cited

U.S. PATENT DOCUMENTS

| | | | |
|---|---|---|---|
| 2004/0107035 A1* | 6/2004 | Tange et al. | 701/70 |
| 2004/0183663 A1* | 9/2004 | Shimakage | 340/436 |
| 2004/0215393 A1* | 10/2004 | Matsumoto et al. | 701/300 |
| 2005/0125125 A1* | 6/2005 | Matsumoto et al. | 701/41 |
| 2005/0177308 A1* | 8/2005 | Tange et al. | 701/301 |
| 2005/0216190 A1* | 9/2005 | Obata | 701/209 |
| 2005/0273261 A1* | 12/2005 | Niwa et al. | 701/301 |
| 2006/0265125 A1* | 11/2006 | Glaza | 701/210 |
| 2007/0156334 A1* | 7/2007 | Vu | 701/209 |
| 2007/0179709 A1* | 8/2007 | Doyle | 701/209 |
| 2007/0288162 A1* | 12/2007 | Furukawa | 701/210 |
| 2008/0177462 A1* | 7/2008 | Yoshioka et al. | 701/200 |
| 2009/0005934 A1* | 1/2009 | Iwasaka et al. | 701/42 |
| 2010/0088019 A1* | 4/2010 | Barcklay et al. | 701/201 |
| 2010/0121565 A1* | 5/2010 | Uyeki et al. | 701/201 |
| 2010/0185387 A1* | 7/2010 | Sengoku et al. | 701/201 |
| 2011/0022317 A1* | 1/2011 | Okita | 701/301 |
| 2011/0034128 A1* | 2/2011 | Kirsch | 455/41.3 |
| 2012/0303262 A1* | 11/2012 | Alam et al. | 701/410 |
| 2013/0096767 A1* | 4/2013 | Rentschler et al. | 701/28 |

* cited by examiner

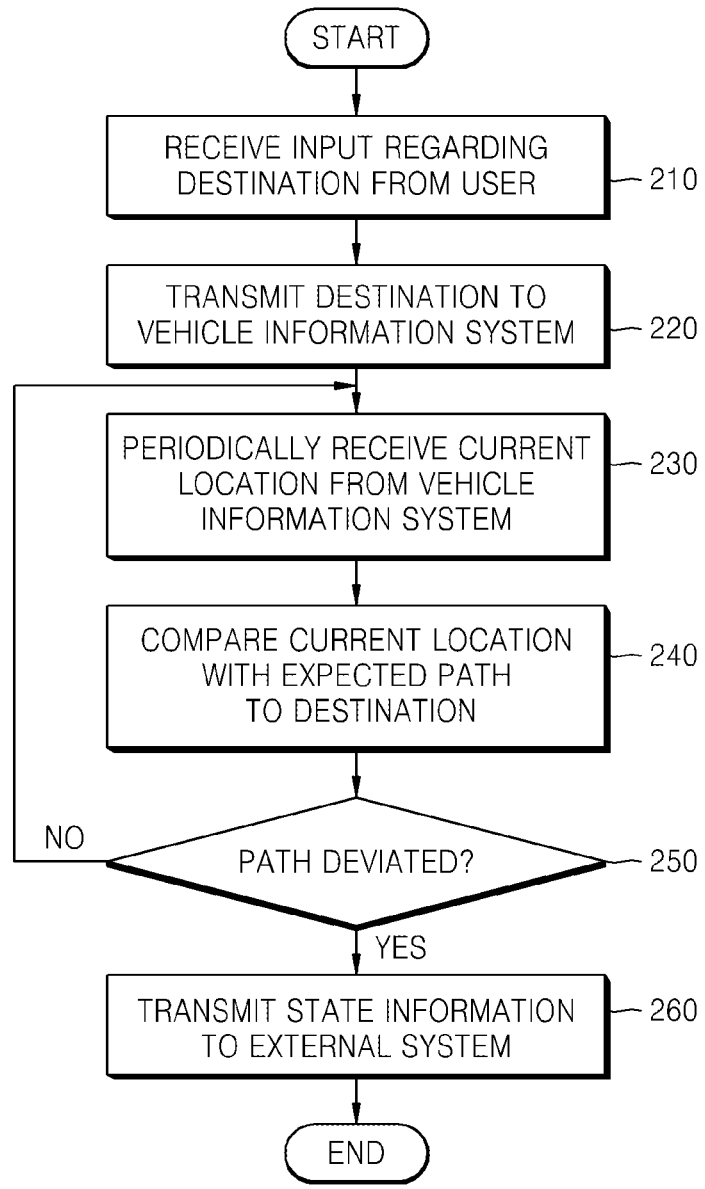

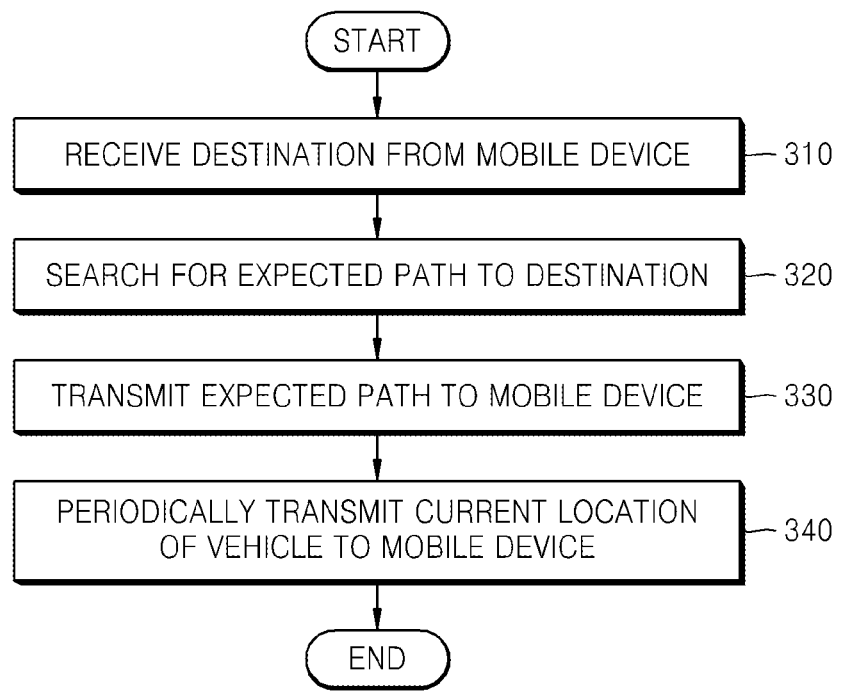

US 8,996,297 B2

SYSTEM AND METHOD FOR OFF-ROUTE DETERMINATION VIA THRESHOLD FOR SAFE TAXI SERVICE

CROSS-REFERENCE TO RELATED PATENT APPLICATION

This application claims priority from Korean Patent Application No. 10-2010-0125661, filed on Dec. 9, 2010 in the Korean Intellectual Property Office, the disclosure of which is incorporated herein in its entirety by reference.

BACKGROUND

1. Field

Apparatuses and methods consistent with exemplary embodiments relate to a safe taxi service, and more particularly, to a service and method for a safe taxi service, capable of ensuring the safety of a taxi user carrying a mobile device.

2. Description of the Related Art

In order to ensure the safety of a taxi user, a method of tracking the current location of the taxi user and transmitting tracked location information to a third party is in use. Information regarding the location of the taxi user is acquired by a location determination performed using a cell ID of an external service provider such as a mobile carrier, or using a global positioning system (GPS) sensor installed in a mobile device of the taxi user.

However, according to the above methods, the location of the taxi user may not be precisely determined or may be difficult to track. In particular, the position determination using a cell ID of an external service provider has low precision, and a GPS sensor mounted on a taxi user's mobile device may experience difficulties in receiving GPS signals in a vehicle. Furthermore, to provide additional information for improved reliability, such as user information regarding a user's destination or path, etc., and vehicle information regarding a registration number, a driver, etc., the user may need to personally input such information, which requires time and costs for the transmission of detailed information. Furthermore, the user may inconveniently report their destination or vehicle information by calling a call center or registering the same in detail via a short message service (SMS).

SUMMARY

Aspects of exemplary embodiments provide a system and method for a safe taxi service, capable of providing a safe taxi service through communication between a taxi user's mobile device and a vehicle information system mounted on a vehicle.

According to an aspect of an exemplary embodiment, there is provided a method for a safe taxi service in a mobile device, the method including: transmitting input information regarding a destination to a vehicle information system; periodically receiving information regarding a current location of a vehicle from the vehicle information system; comparing the current location with an expected path to the destination; and transmitting state information to an external system when it is determined, according to the comparing, that the current location deviates from the expected path to the destination to an extent equal to or greater than a predetermined limit.

The method may further include receiving information regarding the expected path from the vehicle information system in response to the transmitting the information regarding the destination.

The method may further include transmitting information regarding a preferred path, input from a user, to the vehicle information system as the expected path to the destination.

The method may further include receiving information regarding the vehicle from the vehicle information system.

The state information may include information regarding the vehicle and information regarding the current location.

The transmitting the state information to the external system may include: transmitting the state information to the external system at a first cycle when it is determined, according to the comparing, that the current location is in the expected path to the destination with a deviation less than the predetermined limit; and transmitting the state information to the external system at a second cycle, shorter than the first cycle, when it is determined, according to the comparing, that the current location deviates from the expected path to the destination to an extent equal to or greater than the predetermined limit.

According to an aspect of another exemplary embodiment, there is provided a method for a safe taxi service in a vehicle information system, the method including: receiving information regarding a destination from a mobile device; searching for an expected path to the destination and transmitting information regarding the searched expected path to the mobile device; and periodically transmitting information regarding a current location of a vehicle to the mobile device.

According to an aspect of another exemplary embodiment, there is provided a mobile device providing a safe taxi service, the mobile device including: a first communication unit which communicates with a vehicle information system; a second communication unit which communicates with an external system; and a path tracking unit which transmits information regarding a destination to the vehicle information system through the first communication unit, periodically receives information regarding a current location of a vehicle from the vehicle information system, compares the current location with an expected path to the destination, and transmits state information to the external system through the second communication unit when it is determined, according to the comparing, that the current location deviates from the expected path to the destination to an extent equal to or greater than a predetermined limit.

According to an aspect of another exemplary embodiment, there is provided a vehicle information system providing a safe taxi service, the vehicle information system including: a communication unit which communicates with a mobile device; a navigation unit which searches for an expected path to a destination; a location determination unit which acquires information regarding a current location of a vehicle; and a vehicle information management unit which receives information regarding a destination from the mobile device through the communication unit, transmits information regarding the expected path to the destination, searched by the navigation unit, to the mobile device, and periodically transmits the information regarding the current location of the vehicle to the mobile device.

BRIEF DESCRIPTION OF THE DRAWINGS

The above and other features and advantages will become more apparent by describing in detail exemplary embodiments with reference to the attached drawings in which:

FIG. 2 illustrates a flowchart of a method for a safe taxi service in a mobile device, according to an exemplary embodiment; and FIG. 3 illustrates a flowchart of a method for a safe taxi service in a vehicle information system, according to an exemplary embodiment.

DETAILED DESCRIPTION OF EXEMPLARY EMBODIMENTS

Figure 1:
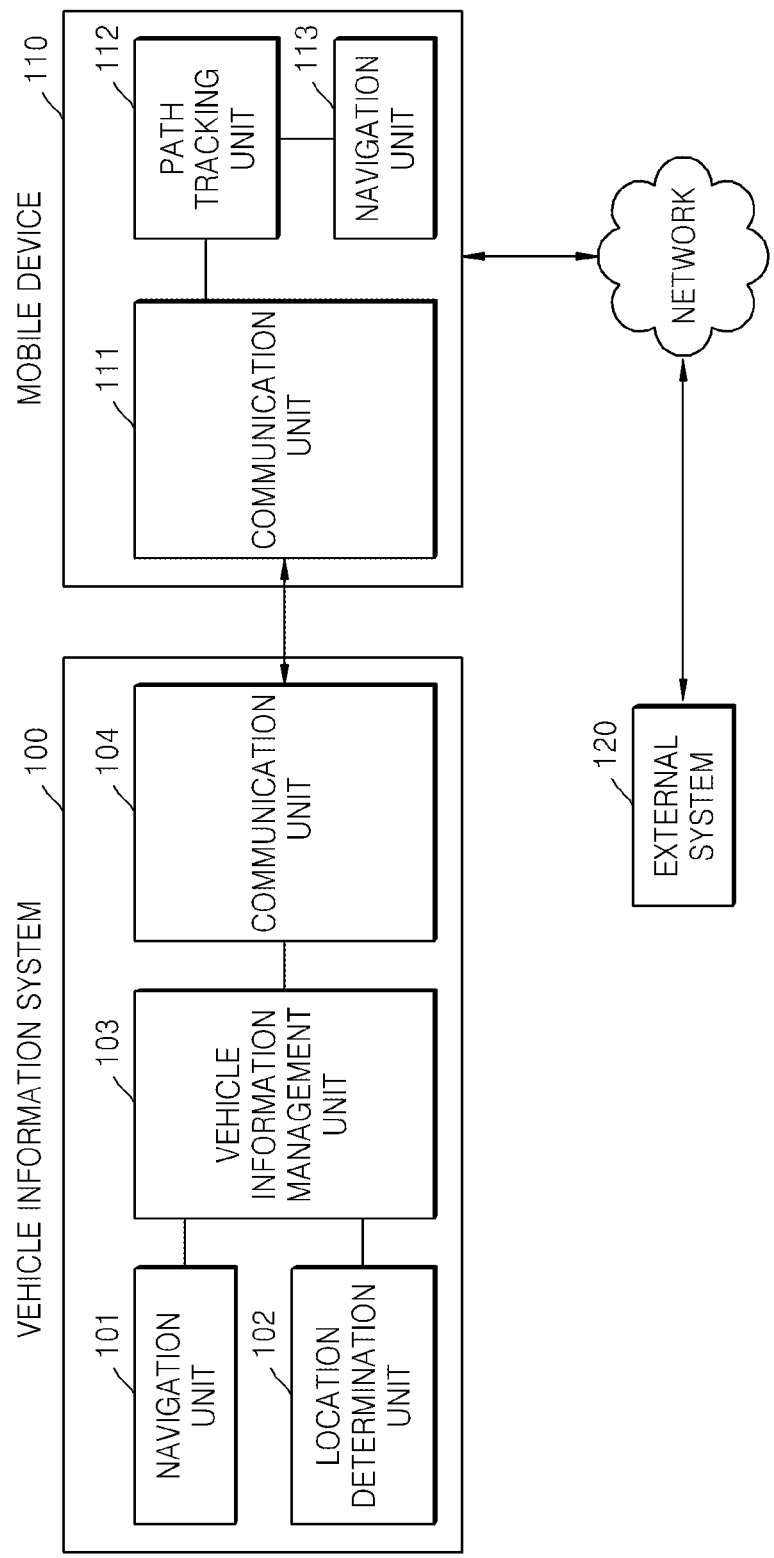
FIG. 1 illustrates a block diagram of a system for a safe taxi service, according to an exemplary embodiment.

Exemplary embodiments will now be described in detail with reference to the accompanying drawings. Expressions such as "at least one of," when preceding a list of elements, modify the entire list of elements and do not modify the individual elements of the list.

FIG. 1 illustrates a block diagram of a system for a safe taxi service, according to an exemplary embodiment.

The system for a safe taxi service may include a vehicle information system 100 mounted on a vehicle, a mobile device 110 carried by a user (i.e., a passenger), and an external system 120 accessible by the mobile device 110 via a network. The vehicle information system 100 performs a navigation operation, manages information regarding a vehicle, and provides the mobile device 110 with information regarding the current location of the vehicle. The mobile device 110 provides the vehicle information system 100 with information regarding a destination, input by the user, and compares an actual path with an expected path to the destination on the basis of information regarding the current location of the vehicle received from the vehicle information system 100. When it is determined that there is path deviation, the mobile device 100 informs the external system 120 of the path deviation.

The vehicle information system 100 includes a first communication unit 104 for communication with the mobile device 110 inside the vehicle, a navigation unit 101 that searches for an expected path to the destination, a location determination unit 102 that acquires the current location of the vehicle, and a vehicle information management unit 103 that receives destination information (i.e., information regarding the destination) from the mobile device 110 through the first communication unit 104, transmits an expected path with respect to the destination found by the navigation unit 101 to the mobile device 110, and periodically transmits information regarding the current location of the vehicle, acquired by the location determination unit 102, to the mobile device 110. The vehicle information management unit 103 manages vehicle information (i.e., information regarding the vehicle), such as information regarding the location, registration number, and driver of the vehicle, and transmits the vehicle information to the mobile device 110 or allows the user to check the vehicle information by using the mobile device 110. The first communication unit 104 may include a local area communication module, such as a wireless fidelity (WiFi) module, an Ad-hoc module, a Bluetooth module, or the like, for communication with the mobile device 110. The location determination unit 102 may include a location determining sensor such as a GPS sensor, an adaptive cruise control (ACC) sensor, or the like.

The mobile device 110 includes a second communication unit 111 for communication with the vehicle information system 100 mounted on the vehicle, and a path tracking unit 112 transmitting destination information to the vehicle information system 100 through the second communication unit 111, periodically receiving the information regarding the current location of the vehicle from the vehicle information system 100, comparing the current location with the expected path to the destination, and transmitting state information to the external system 120 when it is determined that the current location deviates from the expected path to the destination to an extent equal to or greater than a predetermined limit. The second communication unit 111 may include a local area communication module, such as a WiFi module, an Ad-hoc module, a Bluetooth module, or the like, for communication with the vehicle information system 100. Furthermore, the mobile device 110 may further include a third communication unit (not shown) for transmitting information to the external system 120 via a network. Also, the mobile device 110 may further include a navigation unit 113 for providing an operation permitting the search for a path preferred by the user.

The external system 120 may be a server run for a taxi user's safe arrival in association with a police server, though it is understood that another exemplary embodiment is not limited thereto. The external system 120 may be configured as a plurality of systems including a terminal of a third party, for example, a family member.

FIG. 2 illustrates a flowchart of a method for a safe taxi service in the mobile device 110, according to an exemplary embodiment.

In operation 210, a user (i.e., a passenger) inputs destination information to his mobile device 110 before or after getting into a vehicle. In operation 220, the input destination information is sent to the vehicle information system 100. In this case, the user, after getting into the vehicle, may access the vehicle information system 100 by using the mobile device 110 and then transmit the destination information thereto. The mobile device 110 may receive information regarding an expected path to the destination from the vehicle information system 100 in response to the transmission of the destination information. Also, the mobile device may transmit information regarding an expected path to the vehicle information system 100. For example, in the case in which the user selects a preferred path to the destination by using the mobile device 110, the preferred path may be provided to the vehicle information system 110 as the expected path. Consequently, the mobile device 110 of the user and the vehicle information system 100 mounted on the vehicle share the destination and the expected path.

When a driver starts driving, the mobile device 110 periodically receives information regarding the current location of the vehicle from the vehicle information system 100 in operation 230. Also, vehicle information such as the registration number of the vehicle, driver information, and the like may be received from the vehicle information system 100. To determine the deviation of the actual path of the vehicle from the expected path, the mobile device 110 continuously compares the current location of the vehicle with the expected path to the destination in operation 240. When it is determined that the current location of the vehicle has deviated from the expected path to an extent equal to or greater than a predetermined limit in operation 250, the mobile device 110 transmits state information to the external system 120 in operation 260. The state information being sent to the external system 120 may include information regarding at least one of the current location of the vehicle, the destination, the expected path, the actual path, and the vehicle information. Furthermore, the state information is output to the mobile device 110, thereby allowing the user to be aware of the occurrence of the path deviation.

Another method may be used to report the deviation from the expected path according to one or more other exemplary embodiments. For example, even while the actual path may be considered to be in the expected path with a slight deviation less than the predetermined limit, state information including the current location of the vehicle is periodically sent to the external system 120. When the deviation occurs to an extent exceeding the predetermined limit, the state information is sent to the external system 120 at shorter cycles than normal, thereby reporting an emergency.

FIG. 3 illustrates a flowchart of a method for a safe taxi service in the vehicle information system 100, according to an exemplary embodiment.

Referring to FIG. 3, the vehicle information system 100 receives the destination information from the passenger's mobile device 110 located within a transmission range in operation 310. The vehicle information system 100 searches for an expected path to the destination in operation 320 to thereby begin a path guide. Information regarding the found expected path is transmitted to the mobile device 110 in operation 330. Furthermore, vehicle information may be transmitted to the mobile device 110. In the case in which information regarding the expected path is received from the mobile device 100, the vehicle information system 100 informs a driver of the received information regarding the expected path without the search or transmission of the path. The vehicle information system 100 periodically acquires information regarding the current location of the vehicle being driven and transmits the information to the mobile device 110.

According to an exemplary embodiment, the safety of a taxi user can be ensured by communication between the taxi user's mobile device and a vehicle information system mounted on a vehicle. Furthermore, a passenger, as well as a third party, may be immediately informed of a deviation of a current location from an expected path. Also, since the third party can be informed of the current location of the passenger, the taxi user, and information regarding the vehicle, immediate action can be taken in case of a dangerous situation. Also, time and costs incurred by the use of a call center, an audio response system (ARS), an SMS, or the like to initiate the service can be saved, and unnecessary costs for the notification of the current location under a normal driving condition can also be saved.

While exemplary embodiments have been particularly shown and described above, it will be understood by those of ordinary skill in the art that various changes in form and details may be made therein without departing from the spirit and scope of the present inventive concept as defined by the following claims. Exemplary embodiments can also be embodied as computer readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. Exemplary embodiments can also be embodied as computer readable codes over carrier waves (such as data transmission through the Internet). The computer-readable recording medium can also be distributed over network-coupled computer systems so that the computer readable code is stored and executed in a distributed fashion.

What is claimed is:

1. A method for transmitting information in a mobile device, the method comprising:
   transmitting input information regarding a destination from the mobile device to a vehicle information system mounted on a vehicle, through a first communication unit of the mobile device;
   periodically receiving, from the vehicle information system, information regarding a current location of the vehicle, through the first communication unit of the mobile device;
   comparing, using a processor of the mobile device, the current location with an expected path regarding the destination; and
   transmitting state information from the mobile device to an external system in response to determining that the current location deviates from the expected path regarding the destination to an extent equal to or greater than a predetermined limit, through a second communication unit of the mobile device.

2. The method of claim 1, further comprising receiving, from the vehicle information system, information regarding the expected path in response to the transmitting the information regarding the destination.

3. The method of claim 1, further comprising transmitting, to the vehicle information system, information regarding the expected path.

4. The method of claim 1, further comprising receiving, from the vehicle information system, information regarding the vehicle.

5. The method of claim 1, wherein the state information comprises information regarding the vehicle and information regarding the current location.

6. The method of claim 1, wherein the state information is transmitted to the external system in cycles, and
   transmitting the state information comprises:
      transmitting, to the external system, the state information at a first cycle in response to determining that the current location is in the expected path regarding the destination with a deviation less than the predetermined limit; and
      transmitting, to the external system, the state information at a second cycle, shorter than the first cycle, in response to determining that the current location deviates from the expected path regarding the destination to an extent equal to or greater than the predetermined limit.

7. A non-transitory computer-readable recording medium storing a program for executing a method for transmitting information in a mobile device, the method comprising:
   transmitting input information regarding a destination from the mobile device to a vehicle information system mounted on a vehicle, through a first communication unit of the mobile device;
   periodically receiving, from the vehicle information system, information regarding a current location of the vehicle, through the first communication unit of the mobile device;
   comparing, using a processor of the mobile device, the current location with an expected path regarding the destination; and
   transmitting state information from a second communication unit of the mobile device to an external system in response to determining that the current location deviates from the expected path regarding the destination to an extent equal to or greater than a predetermined limit.

8. A mobile device comprising:
   a first communication unit configured to communicate with a vehicle information system mounted on a vehicle;
   a second communication unit configured to communicate with an external system; and
   a path tracking unit configured to:
      transmit, to the vehicle information system through the first communication unit, information regarding a destination;

periodically receive, from the vehicle information system, information regarding a current location of the vehicle, through the first communication unit of the mobile device;

compare, using a processor of the mobile device, the current location with an expected path regarding the destination; and transmit state information from the second communication unit of the mobile device to the external system through the second communication unit, in response to determining that the current location deviates from the expected path regarding the destination to an extent equal to or greater than a predetermined limit.

9. The mobile device of claim 8, wherein the path tracking unit is further configured to receive, from the vehicle information system, information regarding the expected path regarding the destination in response to the transmission of the information regarding the destination.

10. The mobile device of claim 8, further comprising:

a navigation unit configured to allow a user to select a preferred path regarding the destination, wherein the path tracking unit is further configured to transmit, to the vehicle information system, information regarding the selected preferred path as information regarding the expected path regarding the destination.

11. The mobile device of claim 8, wherein the path tracking unit is further configured to receive, from the vehicle information system, information regarding the vehicle.

12. The mobile device of claim 8, wherein the state information comprises information regarding the vehicle and information regarding the current location.

13. The mobile device of claim 8, wherein the path tracking unit is further configured to:

transmit the state information to the external system in cycles; transmit, to the external system, the state information at a first cycle in response to determining that the current location is in the expected path regarding the destination with a deviation less than the predetermined limit, and transmit, to the external system, the state information at a second time interval, shorter than the first cycle, in response to determining that the current location deviates from the expected path regarding the destination to an extent equal to or greater than the predetermined limit.

14. The mobile device of claim 8, wherein the first communication unit comprises a local area communication module.

* * * * *